United States Patent [19]
Webb et al.

[11] Patent Number: 5,429,741
[45] Date of Patent: * Jul. 4, 1995

[54] SLUDGE CONDITIONING

[75] Inventors: John L. Webb, Richmond; W. William Coe, Houston; Robert D. Kilgore, Rosharon; Shitalprasad N. Patil, Houston, all of Tex.

[73] Assignee: Ecosorb International, Inc., Houston, Tex.

[ * ] Notice: The portion of the term of this patent subsequent to Jan. 21, 2009 has been disclaimed.

[21] Appl. No.: 182,802

[22] Filed: Jan. 14, 1994

Related U.S. Application Data

[63] Continuation-in-part of Ser. No. 905,021, Jun. 26, 1992, abandoned, which is a continuation-in-part of Ser. No. 746,938, Aug. 19, 1991, Pat. No. 5,195,465, which is a continuation-in-part of Ser. No. 383,167, Jul. 20, 1989, Pat. No. 5,082,563.

[51] Int. Cl.⁶ .................. B01D 15/04; B01J 39/00; C02F 1/28; C02F 1/42
[52] U.S. Cl. .................. 210/242.4; 210/631; 210/663; 210/671; 210/680; 210/691; 210/922; 210/924; 119/171; 119/172
[58] Field of Search ........... 210/671, 680, 691, 242.4, 210/924, 631, 663, 922; 119/171, 172

[56] References Cited

U.S. PATENT DOCUMENTS

| | | | |
|---|---|---|---|
| 12,882 | 5/1855 | Weiser . | |
| 374,208 | 12/1887 | Sewall . | |
| 1,718,507 | 6/1929 | Wenzel et al. . | |
| 1,978,125 | 10/1934 | Bennett | 91/68 |
| 2,179,591 | 11/1939 | Godchaux . | |
| 2,470,641 | 5/1949 | Portz | 252/62 |
| 2,553,781 | 5/1951 | Oliver | 117/137 |
| 3,027,326 | 3/1962 | Moffett | 252/62 |
| 3,675,625 | 7/1972 | Miller et al. | 119/1 |
| 3,791,990 | 2/1974 | Fischer | 252/427 |
| 4,009,684 | 3/1977 | Kliment et al. | 119/1 |
| 4,082,532 | 4/1978 | Imhof | 71/8 |
| 4,085,704 | 4/1978 | Frazier | 119/1 |
| 4,187,983 | 2/1980 | Boyer | 239/9 |
| 4,258,660 | 3/1981 | Pris et al. | 119/1 |

(List continued on next page.)

FOREIGN PATENT DOCUMENTS

| | | |
|---|---|---|
| 1107267 | 8/1981 | Canada . |
| 0039522 | 11/1981 | European Pat. Off. . |
| 0094363 | 11/1983 | European Pat. Off. . |
| 0115898 | 8/1984 | European Pat. Off. . |
| 0223431 | 5/1987 | European Pat. Off. . |
| 0331207 | 9/1989 | European Pat. Off. . |
| 2162689 | 6/1971 | France . |
| 1542263 | 5/1970 | Germany . |
| 2205641 | 11/1972 | Germany . |
| 2725687C2 | 12/1978 | Germany . |
| 118199 | 2/1947 | Sweden . |

OTHER PUBLICATIONS

"Animal Bedding-a capital idea," Resource Recycling, Jul., 1990.
"Broiler Litter Makes Hits Stocker Program Work," Progressive Farmer, Jun., 1991.

(List continued on next page.)

*Primary Examiner*—Nathan M. Nutter
*Attorney, Agent, or Firm*—Guy McClung

[57] ABSTRACT

Methods are described for treating sludge, e.g. biological and/or chemical sludge, with processed cellulose material combined with another material, e.g. a surface active agent, a detergent, a surfactant, a polymer and/or an organic polymer.

Cellulose flakes and methods for making them are disclosed; in one aspect the flakes are useful as animal litter or bedding; in one aspect such used flakes are re-pelletized for use as litter, food or fertilizer. Methods for absorbing, removing, and for cleaning up a first liquid floating on or in a second liquid are disclosed, the method employing absorbent pellets which, in preferred embodiments, have a particular size, density, and configuration. A pellet and a method for making the pellet are disclosed for cleaning up a first liquid floating on or in a second liquid; and a method for making pellets for absorbing a combustible material to produce fuel pellets. A method for producing fuel pellets is disclosed. In one aspect such materials are disclosed with surface active agent therein and/or thereon and methods for producing such material.

6 Claims, 2 Drawing Sheets

U.S. PATENT DOCUMENTS

| | | |
|---|---|---|
| 4,263,873 | 4/1981 | Christianson ............ 119/1 |
| 4,285,719 | 8/1981 | Criss ............ 71/13 |
| 4,296,709 | 10/1981 | Schulein, Jr. ............ 119/1 |
| 4,343,680 | 8/1982 | Field et al. ............ 162/100 |
| 4,360,440 | 11/1982 | Boyer et al. ............ 252/62 |
| 4,374,794 | 2/1983 | Kok ............ 264/122 |
| 4,407,231 | 10/1983 | Colborn et al. ............ 119/1 |
| 4,444,830 | 4/1984 | Erickson ............ 428/246 |
| 4,519,918 | 5/1985 | Ericsson et al. ............ 210/680 |
| 4,537,877 | 8/1985 | Ericsson ............ 502/402 |
| 4,570,573 | 2/1986 | Lohmanon ............ 119/1 |
| 4,621,011 | 11/1986 | Fleischer et al. ............ 428/221 |
| 4,625,679 | 12/1986 | Hill ............ 119/1 |
| 4,721,059 | 1/1988 | Lowe et al. ............ 119/1 |
| 4,780,518 | 12/1988 | Ceaser ............ 527/300 |
| 4,794,022 | 12/1988 | Johnson et al. ............ 427/212 |
| 4,821,677 | 4/1989 | Harrison ............ 119/1 |
| 4,829,045 | 5/1989 | Fransham ............ 502/401 |
| 4,923,121 | 5/1990 | Boyer ............ 239/434.5 |
| 4,925,343 | 5/1990 | Raible et al. ............ 405/60 |
| 4,931,139 | 6/1990 | Phillips ............ 162/100 |
| 4,949,672 | 8/1990 | Ratcliff et al. ............ 119/1 |
| 5,009,908 | 4/1991 | Molaug et al. ............ 426/454 |
| 5,014,650 | 5/1991 | Sowle et al. ............ 119/171 |
| 5,018,482 | 5/1991 | Stanislowski ............ 119/173 |
| 5,062,954 | 11/1991 | Leedy et al. ............ 210/502.1 |
| 5,082,563 | 1/1992 | Webb et al. ............ 210/631 |
| 5,084,349 | 1/1992 | Sasaki et al. ............ 428/398 |
| 5,207,389 | 5/1993 | Hall et al. ............ 241/3 |
| 5,244,583 | 9/1993 | Goran et al. ............ 210/783 |

OTHER PUBLICATIONS

"Cows Munch Litter Pellets," Progressive Farmer, May, 1991.
"Waste Age's Recycling Times," Sep. 25, 1990.
Cincinnati Fiber, Inc., "Material Safety Data Sheet," 1987.
International Cellulose Corporation, "Celbar 2 Loose Fill Cellulose Insulation," Feb. 1988.
International Cellulose Corporation, "K-13 fc Ceiling Systems," 1987.
Composted Municipal Garbage for Broiler Litter, by Malone et al, 1982.
Influence Of Litter Type and Size on Broiler Performance 1. "Factors Affecting Litter Consumption," Malone et al, 1982. Recycled Paper Products as Broiler Litter, by Malone et al, 1982.
Influence of Litter Type and Size on Broiler Performance 2. Processed Newspaper Litter Particle Size and Management by Malone et al, 1982.
"Final Report," Cabe Associates, Inc., Nov. 91(not prior art).
"SorbaSolv", Omni Divison of Ajax.
NERAC Search Report, refers to numerous prior art reference.
Cincinnati Fiber, Inc., "Cell Dry (TM)-Gobbler (TM)," dated prior to May, 1988.
Oil-Dri Corporation of America, "Oil-Dri," (product bag) 1983.
Absorptive Technology, Inc. "Kitty Flush," (product bag), dated prior to May, 1988.
Balcones Mineral Corp., "Absorb-N-Dry," (product bag) dated prior to May, 1988.
J.V. Manufacturing Co., Inc., "Hydrovac," 1987.
New Pig Corporation, "Only a Pig Can Eat All This," 1987.
Conwed Corp., "Conwed Industrial Sorbent Products," 1984.
Sorbent Products Co., Inc., "The SPC Solution," dated prior to May, 1988.
"Material Safety Data Sheet", Cincinatti Fiber, Inc., Dec. 18, 1987.
"Celbar 2 Loose Fill Cellulose Insulation", International Cellulose Corporation, Feb. 1988.
"K-13 fc Ceiling Systems Acoustics and Noise Control", International Cellulose Corporation, 1987.
"Cell Dry TM -Gobbler TM ", Cincinnati Fiber Inc.
"Used by Professional Mechanics to Soak Up Oil Spills and Keep Floors Spotless", Oil-Dri.
"Kitty Flush", Absorptive Technology Inc.
"All Purpose Absorbent Granular Calcined Clay", Balcones Mineral Corp.
"Hydrovac", J.V. Manufacturing Co., Inc.
"When Seconds Count, Remember: Only a Pig* Can Eat All This.", New Pig Corporation, 1987.
"Conwed Industrial Sorbent Products", Conwed Bonded Fiber, May 1984.
"Spill Problems? The SPC Solution for Spill Clean up In-Paint, On Land Or In Water.", Sorbent Products Company, Inc., 1988.

SLUDGE CONDITIONING

RELATED APPLICATION

This application is a continuation-in-part of pending U.S. application Ser. No. 07/905,021, filed on Jun. 26, 1992, and now abandoned; which is a continuation-in-part of U.S. application Ser. No. 746,938, filed on Aug. 19, 1991, issued as U.S. Pat. No. 5,195,465, on Mar. 23, 1993; which is a continuation-in part of U.S. application Ser. No. 383,167, filed on Jul. 20, 1989, and issued as U.S. Pat. No. 5,082,563, on Jan. 21, 1992. The entirety of these disclosures is incorporated herein.

BACKGROUND OF THE INVENTION

1. Field Of The Invention

This invention is related to sludge conditioning and, in one aspect, to conditioning biological or chemical sludge to improve its dewaterabillity with processed cellulose or with processed cellulose combined with another material, e.g. a detergent, surface active agent, surfactant, flocculant or polymer; and, in one aspect, to methods for dewatering chemical sludge with processed cellulose or with processed cellulose combined with another material.

This invention also relates to absorbent cellulose material, to such material with surface active agent, methods for producing such material, and to such material useful as an animal litter. This invention also relates to processed cellulose material for use as an animal litter, as a food, and as a fertilizer.

This invention also relates to methods for cleaning up a liquid floating on or in another liquid and to absorbent pellets useful in such methods. In one embodiment, this invention relates particularly to methods for cleaning up oil spills in salt water using cellulose pellets of a preferred size, configuration and density. This invention relates to methods for making absorbent pellets and to the pellets themselves.

2. Description of Related Art

SUMMARY OF THE PRESENT INVENTION

The present invention, in one embodiment, discloses a method for conditioning biological and/or chemical sludge to facilitate coagulation and/or flocculation of solids, the method including the steps of adding processed cellulose material with a surfactant therein or thereon or with an organic polymer therein or thereon to water to form a slurry and then introducing the slurry into the sludge to be conditioned. In another aspect, the slurry itself includes some sludge to facilitate the introduction of the sludge into a main sludge feed stream to limit or avoid the need to add relatively large quantities of water to the sludge that may then have to be removed through a dewatering process or otherwise disposed of. In one process, water was used because a sludge feed contained cloth rags that could plug a conditioner pump suction. By using a water/cellulose slurry, about ten percent water was added to the sludge feed prior to dewatering. In certain embodiments another material, e.g. a surface active agent, flocculant, detergent, surfactant or organic polymer is applied to the cellulose material by spraying it thereon. In another aspect, untreated cellulose material and the additional material are added simultaneously to the sludge.

A typical surfactant useful in sludge conditioning methods according to this invention is Witconate 1238. Typical organic polymers useful in sludge conditioning methods according to this invention include but are not limited to long chain, water soluble specialty chemicals which are either anionic, (carrying a negative electrical charge) cationic (positive charge) or nonionic (no charge); and are available in dry or solution form [concentrated water solutions (e.g. Mannich product; tertiary polyamines; quatenary polyamines; quatenary poly DADM) or emulsions (polyacrylamide; copolymer) suspended in hydrocarbon oils]. Dry polymers are available in powdered, granular, bead, and flake form. Such polymers include but are not limited to commercially available Percol AC 787 cationic polymer flocculant (from Allred Colloids Company); and 3196 Polymer. Apart from this invention and its teachings and suggestions, such polymers alone have been used to treat sludge.

The present invention, in one embodiment, is directed to absorbent cellulose material having surface active agent(s) therein and/or thereon and to methods for producing such material. In another embodiment such material is formed into pellets which are expanded and, in one specific aspect, used as animal litter.

The present invention in one embodiment is directed to an animal litter made from compacted cellulose (e.g. old newspaper) which has been made into pellets and then flaked, e.g. by crimping and compressing. The pellets are produced in a process which includes a heating step at a sufficient temperature and for a sufficient time period that bacteria and other undesirable living things (organisms, viruses, fungi, molds, eggs. larva, adult insects, microorganisms) are killed, preferably substantially all of them. Also, this process produces a "hot" pellet which dries out (prior to the flaking operation). In this drying step, the pellet opens up somewhat. A dry sterile flaked material provides a less conducive site for the growth of bacteria, fungi, or mold, or for ammonia production. Also, this material produces relatively little dust.

In one process for producing the flaked material according to this invention, the pellets are cut to a size of about half an inch and are then fed between dual opposed rollers of a crimper where they are compressed to increase their surface area.

A fungicide, but not limited to e.g. borax, boric acid, lime or sodium bicarbonate, can be added (e.g. in powdered form) to the flaked material to extend the useful life of litter made from the flaked material. Coloring agents, insecticides and herbicides can also be introduced into the flaked material.

Flaked material made according to this invention can be used as an animal litter for a longer time period than can litters made from natural materials or from other materials that are not processed as described herein. Due to the configuration, density, and size of flakes of the flaked material, urine or other liquids is more readily absorbed and cannot as easily flow through a mass of the material as it can, e.g., through a mass of shredded paper. This inhibits the formation of puddles beneath the material, thus inhibiting the formation of bacteria breeding sites.

In another embodiment of this invention, flaked material which has been used as an animal litter, and has absorbed animal urine and liquids from manure (e.g. but not limited to chicken manure), is made into pellets in a pelletizing process in which, in a heating step, bacteria and other undesirable living organisms are killed. This sterilized repelletized material is an excellent food source for animals, including but not limited to poultry and ruminant animals. Additives for such re-pelletized material include medicines, minerals and vitamins. In another embodiment flaked material that has been used as litter is introduced back into a pelletizing machine with an additional amount of conditioned cellulose fiber to produce a material that is then flaked and used as a litter or as a food source. This process may be repeated.

Flaked material according to this invention is digestible by poultry so that it does not compact in their gizzards as do some other prior art litters.

Flaked material used as litter for animals may also be re-pelletized, with or without a killing-heating step, to produce a pellet usable as fertilizer.

By appropriately sizing the flaked material according to the present invention, compaction of the material by animal weight is reduced and the tendency of the material to adhere to animal feet (e.g. to the feet of poultry or cattle) is reduced. In one embodiment pieces of the material are irregularly shaped and are about one-half inch long, about one-fourth inch wide and about one-eighth inch thick and their density is about 15 to about 22 pounds per cubic foot. Enough of the material is used, preferably, to absorb urine and manure, to control odor, and to prevent build-up on animal feet. Such material is not as easily moved around by animals as, e.g., shredded newspaper; i.e., material according to this invention stays more uniformly in place to cover a given area.

Due to the relatively dry and sterile nature of flaked material according to the present invention, when the material is used as animal litter, it can be removed before it emits an inordinate amount of undesirable odor, e.g. due to ammonia. This makes it easier to either dispose of or work with later.

Certain embodiments of the present invention are directed to: methods for absorbing a first liquid floating on or in a second liquid by using absorbent pellets; to absorbent pellets; and to methods for making the pellets; and to pellets produced by the absorption method. One embodiment of an absorbing method according to this invention for use in cleaning up a first liquid floating on or in a second liquid includes the steps of introducing pellets, preferably made from cellulose, onto or into the first liquid which pellets absorb some or all of the first liquid and then sink beneath the location of the first liquid to a point at which they are recovered or to the bottom of the container, reservoir, or body of the second liquid. In another embodiment, the pellets can be recovered from the location of the first liquid before they sink. In another embodiment of the method, a surfactant sprayed on the pellets may facilitate absorption of the first liquid and decrease the time necessary to cause sinking of the pellets.

In at least preferred embodiments, pellets according to this invention, have a preferred range of densities. In other preferred embodiments, pellets have a preferred range of sizes. In other preferred embodiments, pellets have various preferred configurations. One specific preferred pellet has a preferred range of densities, a preferred range of sizes, and a preferred configuration.

In certain embodiments it is preferred that the flaked material for use as a litter (or for re-use as described above) be formed so that pieces of the flaked material are ridged for additional structural strength and integrity.

One embodiment of a method for making cellulose pellets according to this invention includes the steps of preparing raw cellulose such as paper into a form that can be introduced to subsequent pelletizing steps. In one embodiment, correctly sized cellulose particles are conditioned with water then fed to and through a pelletizing machine which produces pellets. In a preferred embodiment, these pellets are then sized and shaped to desired specifications. Some or all of the undesirable pellets and particles (e.g., dust) can be removed (and re-used). The resulting compressed pellets are useful in various methods. From an amount of compressed pellets that are then flaked, dust and pieces of undesirable size and configuration are also, preferably, removed, e.g. by shaker screens.

There are, therefore, objects of at least certain preferred embodiments of the present invention as follows:

To provide new, useful, unique, efficient, and effective nonobvious methods for conditioning sludge, dewatering sludge, and/or facilitating flocculation and coagulation of solids therein:

Such methods which require less organic polymer than previous methods;

Such methods which produce a drier filter cake of relatively less mass and volume than previous methods, thereby reducing the total mass and volume of waste requiring disposal;

Such methods which produce a higher quality product, thereby reducing the need for further treatment and disposal;

Such methods which take less time;

To provide absorbent cellulose material with organic polymer and/or surface active agent therein and/or thereon; methods for making such material; such material in fibrous form; such material that is pelletized and expanded; such material that is useful as litter; and methods for making such litter;

To provide new, useful, unique, effective and nonobvious material for use as animal litter, food, or fertilizer;

To provide such material for use as animal litter which is relatively dry and sterile for inhibiting the growth of undesirable living organisms including bacteria;

To provide such material which serves as a soft animal bedding material not as subject to compaction as certain prior art materials;

To provide such material which produces relatively little dust;

To provide such material which is combinable with a fungicide, herbicide, insecticide, and/or coloring material To provide such material with relatively higher absorption which can be used for a longer time period as a litter than certain prior art materials'

To provide such a material which can be re-pelletized for use as litter, food, fertilizer, or mulch;

To provide such materials which can have various beneficial additives;

To provide such materials which are biodegradable;

To provide a new, unique, useful, and nonobvious method for absorbing a first liquid floating in or on a second liquid; e.g., but not limited to, a method for cleaning up oil spills in fresh or salt water;

To provide such materials which are corrugated for added strength and integrity;

To provide new, unique, and nonobvious pellets for absorbing a first liquid floating on or in a second liquid; e.g., but not limited to, cellulose pellets of a particular size, configuration, and density;

To provide new, unique, useful, and nonobvious methods for fabricating such pellets for use in such methods;

To provide new, unique, useful, and nonobvious methods for using such pellets and such methods to produce a pellet which has absorbed combustible material or petroleum products and can subsequently be used as a fuel pellet or can be introduced into a recovery process for recovering the petroleum product, or to produce a pellet which can absorb a liquid and which can then be treated or handled to remove the liquid;

To provide a method for cleaning up oil spills in which the pellets used absorb oil floating on water and then sink to the bottom where they biodegrade;

To provide such a method which works well with either natural agitation of the water such as by wind or wave action or in which artificial agitation can be employed to facilitate absorption and to speed-up sinking of the pellets;

To provide a method in which pellets are recovered from a layer of oil or other material before they sink or before they come to rest on the bottom of the container or reservoir, either manually or by mechanical means;

To provide a method in which pellets can be used to absorb a combustible material such as crude oil and hold it at or near the surface of another liquid so that it (and the pellets) can be burned before it mixes with the other liquid or sinks;

To provide a method for producing a cellulose pellet for use in the other methods according to this invention, including the steps of grinding raw paper in a mill to produce particles or pieces which are conditioned with water and metered to a pelletizing machine in which it is extruded to produce pellets of increased density; the pellets are dried, sized, and shaped;

To provide pellets useful in all of the methods described herein;

To satisfy the long-felt needs for a quick and efficient method for cleaning up spilled hazardous, toxic, or obnoxious materials such as chemicals, petroleum products, and crude oil;

To satisfy the long-felt need for a method for cleaning up material which permits recovery or re-use of some of the material'

To satisfy the long-felt need for a method for cleaning up such spills which itself does not result in other environmental or disposal problems;

To satisfy the long-felt need for a produce ?????? useful in such methods;

To provide methods for controlling a first liquid floating in or on a second liquid; particularly oil floating on water;

To provide compressed absorbent pellets, preferably made from newsprint, which are designed and made to float or sink after absorbing an unwanted liquid, depending on the particular application.

The present invention recognizes and addresses the previously-mentioned long-felt needs and provides and elegant, creative and satisfactory meeting of those needs in its various embodiments. To one of skill in this art who has the benefits of this invention's teachings and disclosures, other and further objects and advantages will be clear, as well as others inherent therein, from the following description of presently-preferred embodiments, given for the purpose of disclosure when taken in conjunction with the accompanying materials. Although these descriptions are detailed to insure adequacy and aid understanding, this is not intended to prejudice that purpose of a patent which is to claim an invention no matter how others may later disguise it by variations in form or additions or further improvements. The claims at the end of this specification are intended for this purpose.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

BRIEF DESCRIPTION OF THE DRAWING AND OF THE PHOTOGRAPHS

So that the manner in which the above-recited features, advantages and objects of the invention, as well as others which will be better understood, a more particular description of the invention briefly summarized above may be had by reference to the detailed description of certain preferred embodiments thereof, and the materials which are illustrated in the appended photographs which form a part of this specification. It is to be noted, however, that the appended photographs illustrate preferred embodiments of the invention and are therefore not to be considered limiting of its scope, for the invention may admit to other equivalent and equally effective embodiments.

DESCRIPTION OF PREFERRED EMBODIMENTS

In one preferred embodiment of a process according to the present invention for producing absorbent pellets, cellulose in sheet or board form, preferably Kraft paper, cardboard, or newsprint, with newsprint most preferred, is ground up, The newsprint is fed into a commercially available first stage mill that reduces the paper to pieces in the range of about one inch to about one and a half inches. These pieces are then fed to a finishing mill where they are further reduced to pieces in the range of about one-eighth inch to one-fourth inch in size (largest dimension). These pieces of newsprint are then conditioned with a water spray. [For liquid absorption pellets, it is preferred that the moisture content be in the range of about 12% to about 14% weight, with 13% preferred. For flaked material (crimped and compressed pellets) to be used as litter, it is preferred that the water content be between about 12% to about 20% by weight (with about 15% to about 18% preferred).]

The conditioned newsprint material is then fed into a special pelletizing machine (commercially available model machine 26–300 made by Sprout Bauer Company), that extrudes the material through a die to form pellets. The conditioned newsprint at about four to about seven pounds per cubic foot is fed to the pelletizing machine to produce pellets which are in the preferred density range of about 37 to 47 pounds per cubic foot. The size of the pellets produced by the machine varies. In one embodiment a preferred pellet is generally cylindrical and has a diameter in the preferred range of about one-eighth inch to about one-fourth inch and a length in the preferred range of about one-eighth inch to about three-fourths inch long; the preferred density for this pellet is about 42 pounds of cellulose material per cubic foot. It is preferred that these pellets be dried and the preferred range of moisture content after drying is from about 8% moisture by weight to about 10% moisture by weight. These dried pellets are then further processed; two preferred embodiments resulting from further processing are flaked material (described below) and pellets (described below).

Figures 1, 2, 3:
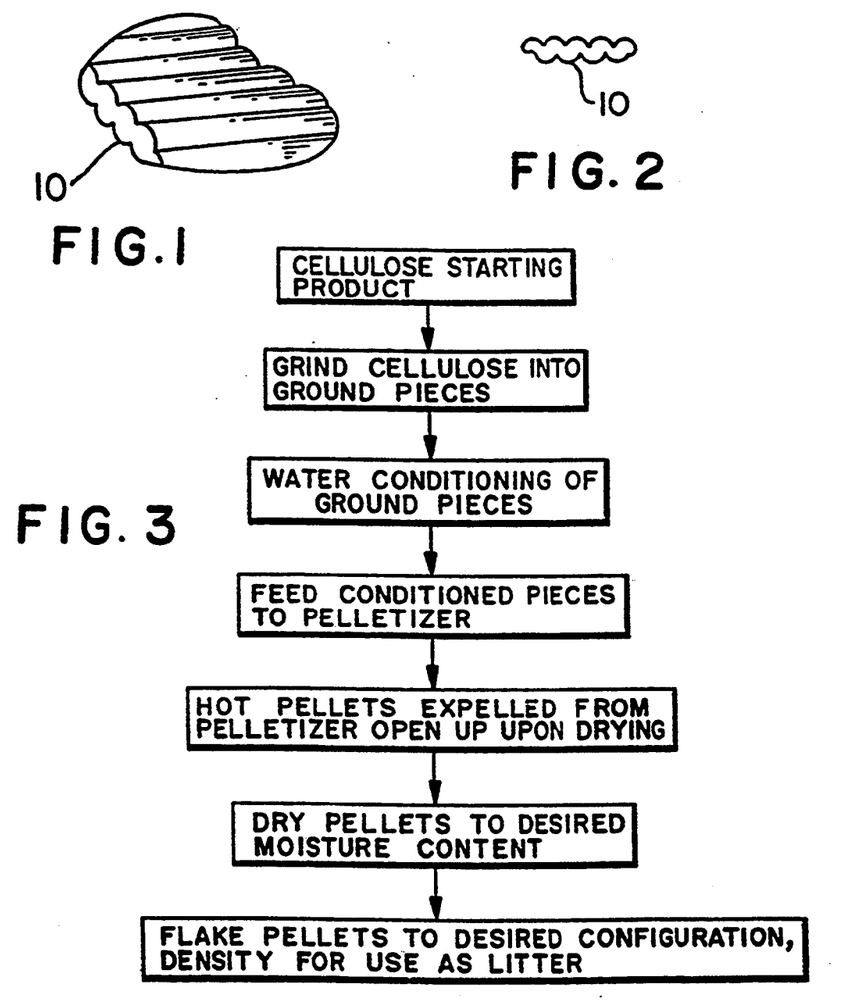
FIG. 1 is a perspective view of a piece of corrugated flaked material according to the present invention.
FIG. 2 is an end view of a piece of currugated flaked material according to the present invention.
FIG. 3 shows schematically a method according to the present invention.
Figure 4:
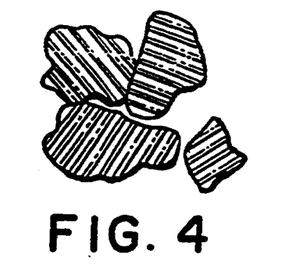
FIGS. 4, 5, and 6 are top views of material according to the present invention.
Figures 5, 6:
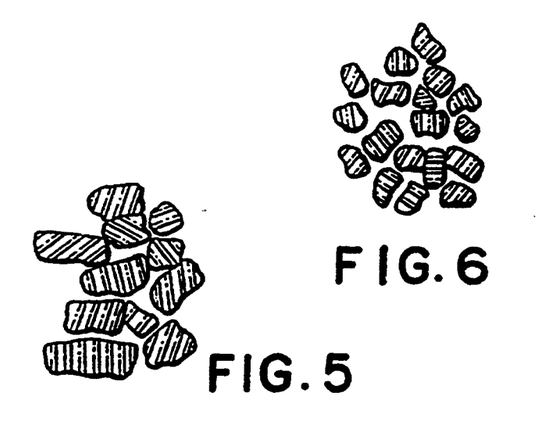

In one embodiment the conditioned newsprint material is heated in the pelletizing machine sufficiently to kill undesirable living organisms, e.g. mold and bacteria. The dried cellulose pellets, in this embodiment, range preferably between about one-eighth inch to about three-quarters inch in length with a length of about one-half inch preferred. These pellets are then fed to a roller mill (e.g., Model FRC 936, Roskamp Co.) wherein they are compressed and flattened between dual opposed rollers which increase the material's surface area, preferably by at least 35% and produce a flaked material. It is preferred that the density of the flaked material range between about 15 to about 22 pounds per cubic foot, with about 20 pounds per cubic foot preferred. It is preferred that the flaked material be about one-eighth to about five-sixteenth of an inch in size. Fungicides such as borax or sodium bicarbonate may be added to these flakes. This flaked material may be used as an animal litter or bedding material. In a preferred embodiment the flakes are dried to a moisture content between about 8% to about 12% by weight. With this size or pieces of flaked material it is possible and it is preferred to impart a regular corrugated shape to the material with the roller mill to increase the surface area, strength and integrity of the pieces. This shape is illustrated by the piece of material 10 (FIG. 1) according to this invention.

In another embodiment of the present invention flaked material as described above (or any cellulose material, pellet or flake) that has been used as animal litter is collected and introduced into a pelletizing machine with or without the addition of cellulose fiber conditioned as described above in which the materials are heated sufficiently to kill undesirable living organisms, preferably substantially all of them. It is preferred that an amount of cellulose equal by weight to about 20% to about 35% of the weight of cellulose in the used litter be added. The pellets thus produced may serve: as food for ruminant animals; litter or as mulch or fertilizer. When used as food, the pellets may have additives added to them such as minerals, vitamins and medicines to make a more complete feed. These pellets are, preferably, between about one-quarter inch and three-quarters of an inch in diameter and between about one inch and three inches in length.

When the material described above is used as an animal litter then collected and re-pelletized to form "re-pellets", the re-pellets may be used as an effective fertilizer. The re-pellets themselves may be broadcast on soil around plants or trees or inserted into the soil or mixed with water or other liquids in a container to be applied to plants or trees. Plant nutrients, fungicides, minerals, insecticides and/or herbicides may be added to the re-pellets when they are to be used as fertilizer.

The flaked material according to this invention is biodegradable, even after use as an animal litter. The flaked material prior to use as an animal litter, or thereafter, is an excellent mulch material.

Table IV presents an analysis of flaked material according to this invention which was used as poultry litter and contained typical turkey urine and manure. The table shows the various food and mineral values contained therein.

TABLE IV

IDENTIFICATION: POULTRY MANURE PLUS FLAKED MATERIAL

| TEST (% by weight) | AS RECEIVED (Wet) | DRY |
|---|---|---|
| MOISTURE % | 12.88 | 0.00 |
| PROTEIN % | 11.88 | 13.64 |
| ASH % | 5.15 | 5.91 |
| FIBER % | 38.22 | 43.87 |
| CALCIUM % | 0.30 | 0.34 |
| PHOSPHORUS % | 0.03 | 0.03 |
| A.D.F. % | 52.43 | 60.18 |
| A.D.F.N. (PROTEIN EQUIVALENT) % | 1.91 | 2.19 |
| PEPSIN DIGESTIBLE PROTEIN (PROTEIN EQUIVALENT) % | 10.83 | 12.43 |
| POTASSIUM % | 0.59 | 0.68 |
| SODIUM % | 0.12 | 0.14 |
| ARSENIC PPM | 0.00 | 0.00 |
| IRON PPM | 71.90 | 82.53 |
| MANGANESE PPM | 107.60 | 123.51 |
| ZINC PPM | 123.70 | 141.99 |
| COPPER PPM | 613.30 | 703.97 |
| MAGNESIUM PPM | 858.80 | 985.77 |
| SULFUR % | 0.17 | 0.20 |
| MERCURY PPM | 0.00 | 0.00 |
| LEAD PPM | 9.70 | 11.23 |
| CADIMIUM PPM | 0.30 | 0.34 |
| ph | 6.60 | 6.60 |
| SaH—NaCL % | 0.30 | 0.34 |

In another embodiment the dried cellulose pellets are fed to a roller mill for sizing and shaping (commercially available model FRC 936 made by The Roskamp Company). The action of the roller mill produces an irregularly shaped pellet along with dust and particles of undesired size. By using a shaker screen, the undesired materials can be separated. In one preferred embodiment, the best density for a cellulose pellet for absorbing oil is in the density range of about 20 pounds of cellulose material per cubic foot to about 30 pounds per cubic foot. The irregularity of shape of this preferred embodiment is a somewhat flattened shape with more surface area than the shape of generally cylindrical non-flattened material of the prior art. Although the type and degree of irregularity as compared to a smooth cylindrical shape has not been quantified, applicants' pellets maintain their position in a first liquid to be absorbed which is floating on a second liquid; the pellets of desired density maintain their position while they are absorbing the first liquid and, in one embodiment, sink in and through the first liquid after absorbing some of the first liquid. The pellets need not become completely saturated with the first liquid; however, they should not be of such a configuration or of such a light density that they float on top of the first liquid without absorbing it or absorbing only an insignificant amount of it. Applicant's pellets cover the spectrum up to, but not including, pellets that sink immediately and, at the other end of the spectrum up to, but not including, pellets that float on the first liquid as described above. Of course sinking and floating can occur with different pellets on different first liquids. The preferred pellets (A,C,E) described above work well with a first liquid which is oil (e.g., crude oil or SAE 90 oil) floating on salt water. Configuration, size, and density can be varied depending on the nature of the first and second liquids.

To present the characteristics and qualities of certain preferred embodiments of pellets and methods according to the present invention, a study was conducted as reflected in Tables I, II, and III. Columns A through G represent data for cellulose pellets according to embodiments of the present invention. Column H presents data for Buckerfield material which is made from cellulose material and commercially available as Kitty Litter (TM). Column I presents data for low-density relatively flat pieces made from cellulose material and commercially available as Kitty Flush (TM). Column K presents data for grey fiber which is made from cellulose and is commercially available as insulation material.

Styrofoam cups were used as containers for salt water onto whose surface was introduced either SAE 90 grade oil or crude.

Each type of pellet was introduced into and onto each type of oil floating on 140 cc's of salty water in a cup which could hold about 200 cc's of liquid. One teaspoon of oil was poured slowly over the water in each cup.

(One teaspoon of SAE 90 grade oil weighed about 5.15 grams; one teaspoon of the viscous crude oil weighed about 4.23 grams). The surface area of the created oil films or slicks in the cups was about 4.91 square inches.

8 grams of each type of absorbent material were spread over the oil in each cup so that each type of absorbent material was used with each type of oil. At regular intervals of time, observations were made regarding the amount of oil absorbed and the amount of absorbent material which had sunk or was still on or in the oil.

Table I presents data for a testing situation in which the water/oil combination was at a temperature of 23 degrees Centigrade and the pH of the water was 7.68. After about 18 hours some of the materials were still floating on the surface of the water/oil combination; but a slight vibration of the cups caused the sinking of virtually all these floating materials.

Table II presents data for a testing situation in which the temperature of the water/oil combination was about 9 degrees Centigrade and the water pH was 8.02. After 20 hours the temperature had risen to 24 degrees Centigrade and some of the materials were still floating; again, a slight vibration caused them to sink.

Table III presents data on the densities of the various materials.

TABLE I

TEST: 1 ABSORPTION OF OIL/WATER BY A,B,C,D,E,F,G,H & I PELL
DATE: 5-3-89 & 5-4-89. TIME STARTED: 2:00 P.M. TEMPERATURE OF OIL/WATER = 23 DEGREES C.;
pH OF WATER = 7.83; WEIGHT OF SAE 90 OIL = 5.15 GM, WEIGHT OF VISCOUS OIL = 4.23 GM,
AREA OF OIL SPREAD = 32 CM$^2$; 140 CM$^3$ WATER USED

| TIME & DATE | TYPE OF OIL | A | B | C | D | E |
|---|---|---|---|---|---|---|
| 2:30 PM 05-03-89 | SAE 90 | 90% ABSORBED 0% SANK | 85% ABSORBED 0% SANK | 100% ABSORBED 5% SANK | 95% ABSORBED 0% SANK | 100% ABSORBED 10% SANK |
| | VISCOUS OIL | 90% ABSORBED 10% SANK | 80% ABSORBED 0% SANK | 97% ABSORBED 10% SANK | 97% ABSORBED 5% SANK | 97% ABSORBED 20% SANK |
| 3:15 PM 05-03-89 | SAE 90 | 100% ABSORBED 10% SANK | 100% ABSORBED 5% SANK | 100% ABSORBED 40% SANK | 100% ABSORBED 5% SANK | 100% ABSORBED 40% SANK |
| | VISCOUS OIL | 100% ABSORBED 20% SANK | 100% ABSORBED 10% SANK | 100% ABSORBED 30% SANK | 100% ABSORBED 15% SANK | 100% ABSORBED 50% SANK |
| 3:45 PM 05-03-89 | SAE 90 | 20% SANK | 10% SANK | 55% SANK | 10% SANK | 6% SANK |
| | VISCOUS OIL | 60% SANK | 15% SANK | 45% SANK | 20% SANK | 65% SANK |
| 4:25 PM 05-03-89 | SAE 90 | 25% SANK | 15% SANK | 60% SANK | 13% SANK | 65% SANK |
| | VISCOUS OIL | 65% SANK | 20% SANK | 50% SANK | 35% SANK | 70% SANK |
| 4:55 PM 05-03-89 | SAE 90 | 30% SANK | 20% SANK | 60% SANK | 15% SANK | 70% SANK |
| | VISCOUS OIL | 75% SANK | 40% SANK | 55% SANK | 50% SANK | 75% SANK |
| 5:25 PM 05-03-89 | SAE 90 | 35% SANK | 25% SANK | 65% SANK | 15% SANK | 75% SANK |
| | VISCOUS OIL | 80% SANK | 50% SANK | 55% SANK | 50% SANK | 78% SANK |
| 5:55 PM 05-03-89 | SAE 90 | 35% SANK | 25% SANK | 65% SANK | 17% SANK | 75% SANK |
| | VISCOUS OIL | 85% SANK | 65% SANK | 55% SANK | 55% SANK | 80% SANK |
| 8:00 AM 05-04-89 | SAE 90 | 35% SANK | 25% SANK | 65% SANK | 20% SANK | 75% SANK |
| | VISCOUS | 87% SANK | 75% SANK | 55% SANK | 60% SANK | 80% SANK |

TABLE I-continued

| | TIME & DATE | TYPE OF OIL | F | G | H* | I** |
|---|---|---|---|---|---|---|
| | 2:30 PM 05-03-89 | SAE 90 | 100% ABSORBED 0% SANK | 99% ABSORBED 0% SANK | 100% ABSORBED 70% SANK | 100% ABSORBED 85% SANK |
| | | VISCOUS OIL | 97% ABSORBED 10% SANK | 97% ABSORBED 10% SANK | 93% ABSORBED 90% SANK | 98% ABSORBED 98% SANK |
| | 3:15 PM 05-03-89 | SAE 90 | 100% ABSORBED 0% SANK | 100% ABSORBED 5% SANK | 100% ABSORBED 85% SANK | 100% ABSORBED 100% SANK |
| | | VISCOUS OIL | 100% ABSORBED 30% SANK | 100% ABSORBED 75% SANK | 100% ABSORBED 98% SANK | 100% ABSORBED 100% SANK |
| | 3:45 PM 05-03-89 | SAE 90 | 0% SANK | 10% SANK | 90% SANK | 100% SANK |
| | | VISCOUS OIL | 40% SANK | 80% SANK | 98% SANK | 100% SANK |
| | 4:25 PM 05-03-89 | SAE 90 | 0% SANK | 12% SANK | 90% SANK | 100% SANK |
| | | VISCOUS OIL | 40% SANK | 80% SANK | 98% SANK | 100% SANK |
| | 4:55 PM 05-03-89 | SAE 90 | 0% SANK | 15% SANK | 90% SANK | 100% SANK |
| | | VISCOUS OIL | 55% SANK | 85% SANK | 98% SANK | 100% SANK |
| | 5:25 PM 05-03-89 | SAE 90 | 0% SANK | 17% SANK | 90% SANK | 100% SANK |
| | | VISCOUS OIL | 60% SANK | 85% SANK | 98% SANK | 100% SANK |
| | 5:55 PM 05-03-89 | SAE 90 | 0% SANK | 20% SANK | 90% SANK | 100% SANK |
| | | VISCOUS OIL | 65% SANK | 90% SANK | 98% SANK | 100% SANK |
| | 8:00 AM 05-04-89 | SAE 90 | 10% SANK | 20% SANK | 90% SANK | 100% SANK |
| | | VISCOUS OIL | 90% SANK | 90% SANK | 98% SANK | 100% SANK |

*BUCKERFIELDS ABSORB MORE WATER THAN OIL FASTER AND SINK TO BOTTOM WITHIN 10 MINUTES. (to 5-8% OIL REMAINS ALONG THE EDGE OF THE STYROFOAM CUP.)
**THESE LOW DENSITY, FLAT CHIPS ABSORBS, ALSO, WATER MORE THAN OIL AND SINKS FASTER IN 15 MINUTES BELOW THE SURFACE.

TABLE II

TEST: 2 ABSORPTION OF OIL/WATER BY A, B, C, D, E, F, G, H, I, J & K J & K
DATE: 5-4-89 & 6-5-89; TIME STARTED: 11:15 A.M.; TEMPERATURE OF OIL AND WATER = 9 DEGREES C, pH OF WATER = 8.02; WEIGHT of SAE 90 = 5.15 GRAMS; WEIGHT OF VISCOUS OIL = 4.23 GRAMS; AREA OF OIL SPREAD = 4.91 INCH$^2$. 140 C.C. OF WATER USED.

| TIME & DATE | TYPE OF OIL | ABSORBING OIL/WATER | | | |
|---|---|---|---|---|---|
| | | A | B | C | D |
| 11:45 A.M. 05-04-89 | SAE 90 | 90% ABSORBED 0.0% SANK | 85% ABSORBED 0.0% SANK | 87% ABSORBED 0.0% SANK | 83% ABSORBED 0.0% SANK |
| | VISCOUS OIL | 95% ABSORBED 0.0% SANK | 80% ABSORBED 0.0% SANK | 90% ABSORBED 0.0% SANK | 80% ABSORBED 0.0% SANK |
| 12:25 P.M. 05-04-89 | SAE 90 | 98% ABSORBED 0.0% SANK | 90% ABSORBED 0.0% SANK | 95% ABSORBED 0.0% SANK | 90% ABSORBED 0.0% SANK |
| | VISCOUS OIL | 98% ABSORBED 0.0% SANK | 90% ABSORBED 0.0% SANK | 95% ABSORBED 0.0% SANK | 90% ABSORBED 0.0% SANK |
| 1:06 P.M. 05-04-89 | SAE 90 | 98% ABSORBED 0.0% SANK | 93% ABSORBED 0.0% SANK | 96% ABSORBED 0.0% SANK | 95% ABSORBED 0.0% SANK |
| | VISCOUS OIL | 96% ABSORBED 0.0% SANK | 96% ABSORBED 0.0% SANK | 87% ABSORBED 0.0% SANK | 85% ABSORBED 0.0% SANK |
| 2:05 P.M. 05-04-89 | SAE 90 | 100% ABSORBED 5% SANK | 96% ABSORBED 0.0% SANK | 100% ABSORBED 5% SANK | 96% ABSORBED 0.0% SANK |
| | VISCOUS OIL | 100% ABSORBED 0.0% SANK | 97% ABSORBED 0.0% SANK | 98% ABSORBED 5% SANK | 96% ABSORBED 0.0% SANK |
| 3:05 P.M. 05-04-89 | SAE 90 | 100% ABSORBED 5% SANK | 98% ABSORBED 5% SANK | 100% ABSORBED 5% SANK | 98% ABSORBED 0.0% SANK |
| | VISCOUS OIL | 100% ABSORBED 0.0% SANK | 100% ABSORBED 0.0% SANK | 100% ABSORBED 5% SANK | 98% ABSORBED 0.0% SANK |
| 4:05 P.M. 05-04-89 | SAE 90 | 100% ABSORBED 20% SANK | 100% ABSORBED 10% SANK | 100% ABSORBED 35% SANK | 100% ABSORBED 0.0% SANK |
| | VISCOUS OIL | 100% ABSORBED 40% SANK | 100% ABSORBED 0.0% SANK | 100% ABSORBED 10% SANK | 100% ABSORBED 10% SANK |
| 4:30 P.M. 05-04-89 | SAE 90 | 100% ABSORBED 25% SANK | 100% ABSORBED 20% SANK | 100% ABSORBED 40% SANK | 100% ABSORBED 0.0% SANK |
| | VISCOUS OIL | 100% ABSORBED 45% SANK | 100% ABSORBED 10% SANK | 100% ABSORBED 15% SANK | 100% ABSORBED 20% SANK |
| 8:00 A.M. 05-05-89 | SAE 90 | 50% SANK | 30% SANK | 40% SANK | 25% SANK |
| | VISCOUS OIL | 60% SANK | 40% BANK | 50% BANK | 55% SANK |

| TIME & DATE | TYPE OF OIL | ABSORBING OIL/WATER | | | |
|---|---|---|---|---|---|
| | | E | F | G | H* |
| 11:45 A.M. 05-04-89 | SAE 90 | 85% ABSORBED 0.0% SANK | 95% ABSORBED 0.0% SANK | 95% ABSORBED 0.0% SANK | 100% ABSORBED 85% SANK |
| | VISCOUS OIL | 85% ABSORBED 0.0% SANK | 85% ABSORBED 0.0% SANK | 90% ABSORBED 0.0% SANK | 100% ABSORBED 90% SANK |

TABLE II-continued

| TIME & DATE | TYPE OF OIL | E | F | G | H |
|---|---|---|---|---|---|
| 12:25 P.M. 05-04-89 | SAE 90 | 90% ABSORBED 0.0% SANK | 85% ABSORBED 5% SANK | 98% ABSORBED 5% SANK | 100% ABSORBED 87% SANK |
| | VISCOUS OIL | 90% ABSORBED 0.0% SANK | 85% ABSORBED 0.0% SANK | 92% ABSORBED 0.0% SANK | 100% ABSORBED 90% SANK |
| 1:06 P.M. 05-04-89 | SAE 90 | 95% ABSORBED 0.0% SANK | 87% ABSORBED 5% SANK | 99% ABSORBED 10% SANK | 100% ABSORBED 90% SANK |
| | VISCOUS OIL | 95% ABSORBED 0.0% SANK | 97% ABSORBED 5% SANK | 85% ABSORBED 0.0% SANK | 100% ABSORBED 95% SANK |
| 2:05 P.M. 05-04-89 | SAE 90 | 100% ABSORBED 0.0% SANK | 99% ABSORBED 5% SANK | 99% ABSORBED 15% SANK | 100% ABSORBED 95% SANK |
| | VISCOUS OIL | 100% ABSORBED 0.0% SANK | 99% ABSORBED 5% SANK | 95% ABSORBED 5% SANK | 100% ABSORBED 95% SANK |
| 3:05 P.M. 05-04-89 | SAE 90 | 100% ABSORBED 0.0% SANK | 99% ABSORBED 5% SANK | 90% ABSORBED 15% SANK | SAME AS ABOVE |
| | VISCOUS OIL | 100% ABSORBED 0.0% SANK | 99% ABSORBED 5% SANK | 95% ABSORBED 5% SANK | 100% ABSORBED 96% SANK |
| 4:05 P.M. 05-04-89 | SAE 90 | 100% ABSORBED 15% SANK | 99% ABSORBED 20% SANK | 99% ABSORBED 40% SANK | SAME AS ABOVE |
| | VISCOUS OIL | 100% ABSORBED 20% SANK | 100% ABSORBED 30% SANK | 100% ABSORBED 30% SANK | 100% ABSORBED 99% SANK |
| 4:30 P.M. 05-04-89 | SAE 90 | 100% ABSORBED 30% SANK | 100% ABSORBED 30% SANK | 100% ABSORBED 50% SANK | SAME AS ABOVE |
| | VISCOUS OIL | 100% ABSORBED 40% SANK | 100% ABSORBED 50% SANK | 100% ABSORBED 35% SANK | 100% ABSORBED 99% SANK |
| 8:00 A.M. 05-05-89 | SAE 90 | 50% SANK | 45% SANK | 50% SANK | 95% SANK |
| | VISCOUS OIL | 65% SANK | 60% BANK | 65% BANK | 99% SANK |

| TIME & DATE | TYPE OF OIL | ABSORBING OIL/WATER I** | J | K |
|---|---|---|---|---|
| 11:45 A.M. 05-04-89 | SAE 90 | 100% ABSORBED 100% SANK | 75% ABSORBED 0.0% SANK | GREY FIBER IS LIGHTER SO THE FIBERS IN CONTACT WITH |
| | VISCOUS OIL | 100% ABSORBED 100% SANK | 85% ABSORBED 0.0% SANK | THE OIL SURFACE ONLY ABSORBED THE OIL AND THE |
| 12:25 P.M. 05-04-89 | SAE 90 | 100% ABSORBED 100% SANK | 90% ABSORBED 0.0% SANK | FIBERS ABOVE REMAINED DRY. THE ABSORBED FIBERS |
| | VISCOUS OIL | 100% ABSORBED 100% SANK | 70% ABSORBED 0.0% SANK | WERE FLOATING ON OIL. |
| 1:06 P.M. 05-04-89 | SAE 90 | SAME AS ABOVE | 85% ABSORBED 0.0% SANK | |
| | VISCOUS OIL | SAME AS ABOVE | 75% ABSORBED 0.0% SANK | |
| 2:05 P.M. 05-04-89 | SAE 90 | SAME AS ABOVE | 90% ABSORBED 0.0% SANK | |
| | VISCOUS OIL | SAME AS ABOVE | 90% ABSORBED 0.0% SANK | |
| 3:05 P.M. 05-04-89 | SAE 90 | SAME AS ABOVE | 95% ABSORBED 0.0% SANK | |
| | VISCOUS OIL | SAME AS ABOVE | 92% ABSORBED 0.0% SANK | |
| 4:05 P.M. 05-04-89 | SAE 90 | SAME AS ABOVE | 95% ABSORBED 0.0% SANK | GREY FIBER SPREAD ON OIL/WATER SURFACE |
| | VISCOUS OIL | SAME AS ABOVE | 95% ABSORBED 0.0% SANK | ABSORBS SOME OIL AND FORMS MAT OF ABSORBED |
| 4:30 P.M. 05-04-89 | SAE 90 | SAME AS ABOVE | 100% ABSORBED 5% SANK | FIBERS AND FLOATS. THE FIBERS ABOVE THAT MAT IS |
| | VISCOUS OIL | SAME AS ABOVE | 100% ABSORBED 5% SANK | DRY. ONLY 2-3 GRAMS OF FIBER OIL ABSORBED |
| 8:00 A.M. 05-05-89 | SAE 90 | 100% SANK | 20% SANK | EVEN AFTER 20 HOURS. |
| | VISCOUS OIL | 100% SANK | 90% SANK | |

*BUCKERFIELD ABSORB WATER FASTER THAN OIL AND SINK TO BOTTOM WITHIN 10 MINUTES.
**THESE LOW DENSITY, FLAT CHIPS, ALSO, ABSORBED MORE WATER FASTER THAN OIL AND SANK BELOW THE SURFACE SO 8-10% SAE-90 OIL REMAINED FLOATING ON THE SURFACE. 25-30% VISCOUS OIL REMAINED AT THE EDGE OF CUP.
J & K SANK BELOW THE SURFACE ONLY.

TABLE III

| NOS. | VOLUME CUBIC CENTIMETERS | WEIGHT GRAMS | DENSITY GRAMS CUBIC CENTIMETERS | POUNDS CUBIC FEET |
|---|---|---|---|---|
| A | 196 | 67.59 | 0.3448 | 21.53 |
| B | 196 | 67.54 | 0.3446 | 21.51 |
| C | 196 | 63.76 | 0.3253 | 20.31 |
| D | 196 | 72.48 | 0.3698 | 23.09 |
| E | 196 | 63.58 | 0.3244 | 20.25 |
| F | 196 | 93.19 | 0.4755 | 29.68 |
| G | 196 | 91.17 | 0.4652 | 29.04 |
| H | 84 | 37.51 | 0.4465 | 27.88 |
| I | 196 | 26.16 | 0.1335 | 8.333 |
| J | 200 | 50.53 | 0.2527 | 15.77 |
| K | 200 | 7.96 | 0.0398 | 2.48 |

After two hours of such testing as reported in Tables I–III, it was discovered that under these conditions, absorption was faster and pellets sank faster in the warmer water at the lower pH with the lower density oil. After 18 to 20 hours of such testing, it became apparent that pellets sank more with the more viscous crude oil than in the SAE 90 oil. The Buckerfield material (type H) absorbed oil/water faster than the other materials and sunk to the bottom so relatively quickly (in about 10 minutes) that unabsorbed oil remained on the water's surface (about 8% to about 10% of the SAE 90 oil remained; about 15% to about 20% of the viscous oil remained). The flat pieces (type I) absorbed a significant amount of water and sank in about 20 minutes leaving behind about 10% of the SAE 90 oil and about 30% of the viscous oil.

The type C,F, and G pellets (Table I; Table II) of relatively high density (about 29 pounds of cellulose per cubic foot of pellets) were found to absorb oil faster than the other pellets. These pellets sank more in viscous oil than in SAE 90 oil.

Although the type A and B pellets had the same density (about 21.5 pounds of cellulose per cubic foot of pellets), the B pellets were smaller in size and surface area as compared to the A pellets. The B pellets absorbed oil and water more slowly than the A pellets and less of the B pellets sank than the A pellets.

All pellets can absorb both oil and water; but they can be preconditioned to absorb only oil or mostly oil by pretreating them with oil; e.g., spraying them with No. 2 diesel oil. Pellets treated in this way may not readily absorb water thus making them float on top of a first liquid, e.g., oil more readily so that a less dense pellet can be used (e.g., a pellet less dense than certain preferred pellets, a pellet less dense than 20 pounds of cellulose per cubic foot). It is preferred that pretreatment occur during the pellet manufacturing process, preferably prior to the final pelletizing step.

The type E,A, and C pellets performed better than the type B,D, and J (Cincinnati Fiber material) in SAE 90 oil—they absorbed more oil more quickly. Pellets of types A through G absorb the SAE 90 almost completely leaving little or no oil on the surface and about 1% of the oil around the edge of the cups, leaving the water looking clean. With the viscous oil, these pellets left about 2% to 3% of the oil behind around the edge of the cup. The grey fiber (type K) did not sink. These fibers were generally so light that they formed an agglomeration of fibers and floated on the surface. Fibers remaining above the agglomerated fibers did not absorb oil, even after about 18 to 20 hours. The fibers at the bottom of the agglomeration absorbed only about half of the oil.

The commercially available prior art Buckerfield's flushable cat litter (type H) is biodegradable and can absorb up to 150% of its own weight and it is described as useful for spilled oil.

The use of the word "pellet" herein regarding absorbing oil or other liquids floating on a second liquid includes a piece of material which functions as described to produce the desired results and is made by compressing cellulose material or its equivalent. Preferred pellets are irregular and have enough surface area to break the surface tension of a first liquid, e.g., oil, floating on a second liquid, e.g., water. In one embodiment the pellets can be pretreated with oil which makes them repel water so that a less dense pellet can be used for those applications in which sinking is not desired, i.e., in those applications in which the pellets after absorbing the first liquid are to be removed from the surface of the first liquid.

In various preferred embodiments of this invention, pellets are provided which can absorb liquid and from which the absorbed liquid can be recovered and subsequently disposed of or treated further or refined. For example, from pellets which have absorbed spilled crude oil, the crude oil can be extracted or squeezed out. Of course, the pellets can be recovered by any suitable manual or mechanical means from the surface, from beneath the surface, or from the bottom of the reservoir, bay, ocean, or container of the liquid. Recovered pellets can be disposed of without removing the absorbed liquid. Pellets which have absorbed a combustible material according to any of the previously described methods can be used as fuel or can be incinerated to dispose of them. Also, pellets in place on a first liquid floating on a second liquid can be set on fire to burn absorbed combustible material and to assist in the burning of liquid in which they are floating. It is also within the scope of this invention to provide agitation or vibration to a first liquid/second liquid combination to enhance either pellet absorption or sinking or both.

Regarding certain preferred embodiments in which the pellets sink after absorbing a material like oil, if the pellets and the oil will be biodegradable by natural causes, there may be no need to recover them.

In one preferred embodiment of a method according to this invention the use of a surfactant can decrease the amount of time for the pellets (which have absorbed a first liquid, such as oil) to sink. Using cups containing salty water with a heavy crude oil top film and cups containing salty water with a SAE 90 oil top film, pellets of types B through G (Table I) were sprinkled on the oil, one type of pellet per cup, a total, of 10 cups. After 10 minutes, the bulk of the oil has been absorbed in each cup and about 2% to 5% of the pellets had sunk to the bottom of the cups. Then a 0.1% solution of a surfactant (commercially available Witconate AOS (TM) surfactant) was misted onto the top of the still—floating pellets. Immediately almost all of the remaining pellets combined with oil and fell to the bottom of the containers.

The relative absorption rates of different amounts of pellets, pellets of types A,C,E,F, and G according to the present invention were demonstrated, again using the previously described styrofoam cups as reservoirs and using four cups of each type of pellet, placing 2,4,6, and 8 grams of each type of pellet on the oil film (5.15 grams of SAE 90 oil) in each cup. Pellets A,C,E were 20–22 pounds per cubic foot; types E and F, 29 to 30 pounds per cubic foot.

Pellets of types G and F are generally heavier and more uniformly round than pellets of types A,C, and E, and pellets of types E and F were more round than types A,C,E. At 20 minutes after sprinkling the pellets on the liquid, the cups with 4 and 6 grams of pellets of types A,C, and E exhibited the best oil absorption with E being the best. The cups with 8 grams of pellets of types A,C,E, and F showed generally good oil absorption. The type G pellets did not perform as well as the other types at any given weight. Also, after the pellets of type G in the cup with 4 grams of pellets had sunk, stirring the pellets caused release of some of the absorbed oil, and it floated up to the surface. Less absorbed oil was released by pellets of type E in the cup with 4 grams of pellets. Such stirring did not result in the release of oil from the pellets in cups with 6 or 8 grams of pellets. All the cups with only 2 grams of pellets had free unabsorbed oil at 20 minutes after sprinkling the pellets. Slight agitation of the cups containing 2 grams of pellets resulted in almost no pellets sinking. Spraying surfactant on the pellets still floating after about 25 minutes resulted in the sinking of almost all the pellets in the cups with 4,6, or 8 grams of pellets.

In testing the liquid retention of various types of cellulose fibers including Champions Mulch #1; Champions Mulch #2; Conwed Wood; Newsprint; Cardboard, 75% Newsprint/ 25% Cardboard; and 50% Newsprint/50% Cardboard; it was determined that 100% Newsprint was most absorbent and the mulches were the least absorbent. Regarding water absorption, tests revealed that the most absorbent material was Newsprint.

Mulch fiber was shown to be heavier compared to other fibers and it absorbed less water. Newsprint (100%) retained more water. Mulch retained the least.

By compressing cellulose material into pellets according to this invention, relatively more mass (higher density) is utilized in a smaller space to provide relatively more absorbability for a given volume and provide more control of a first liquid (e.g., spilled oil) floating on or in a second liquid (e.g., ocean water). However, in some embodiments, a density which results in premature pellet sinking is undesirable. Compressed pellets fashioned to provide control of an oil spill without sinking will facilitate recovery from the surface. Various biodegrading microorganisms that attack and degrade oil and other materials may be included in compressed pellets of this invention.

Figure 7:
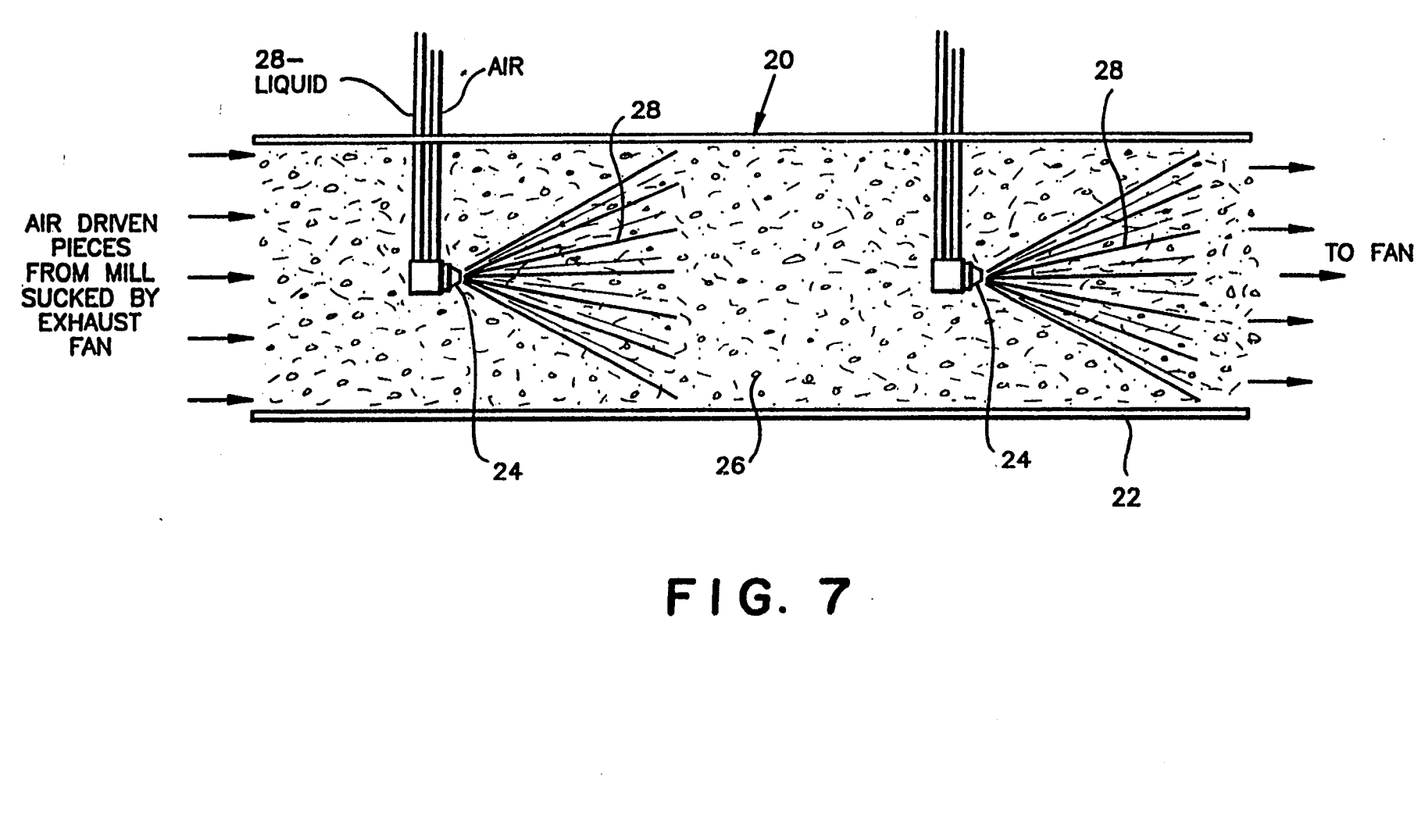
FIG. 7 is a side view in crosssection of a injection system according to the present invention.

In another embodiment of the present invention the reduced pieces of paper (preferably ranging in size between about one inch to about two and a half inches) are fed to a second stage finishing mill to produce pieces ranging preferably in size (largest dimension) between about one-eighth of an inch to about seven-sixteenths of an inch. These pieces are exhausted from the mill in its exhaust air stream and are directed into an injection system 20 as shown in FIG. 7. The system 20 has a central conduit or pipe 22 and one or more pressurized—air-driven spray nozzles 24 which, preferably, spray a water/surface active agent mixture 28 in a direction parallel to and in the same direction as the flow of the cellulose pieces 26 (typically at an spray nozzle air pressure of about 30 p.s.i. for good atomization of the liquid). It is preferred that the pieces be conditioned by the spray to a water content between about 10% to about 22% by weight, with about 18% most preferred. It is preferred that the sprayed pieces have about ½% to about 3% surface active agent by weight therein and/or thereon, with about 1½% most preferred. It is preferred that the sprayed pieces be substantially coated with the water/surfactant mixture. Although it is preferred that the pieces be conditioned by spraying, they may be conditioned by immersion in a container of the mixture or the mixture may be poured onto the pieces, but these methods are not equivalent. The sprayed pieces may be used as they exit the injection system as absorbent material or they may be dried to a lower moisture content as desired, e.g. as low as 5% moisture by weight. Alternately, the sprayed pieces may be fed to a pelletizer to produce pellets as previously described herein. The pellets may be flaked and be used as litter as previously described herein. The surface active agent (such agents sometimes hereinafter referred to as "SAA") increases the material's rate of absorbency and its absorbent capacity. This occurs by reducing the surface tension of liquids and the interfacial tension between two liquids. This reduces waste and processing time (e.g., less screening of product is needed), results in a more consistent product, and reduces the amount of unwanted fine particles and dust.

In one specific preferred embodiment according to this invention pieces of newsprint with a largest dimension of about one inch to about two and a half inches were fed to a second stage finishing mill and reduced in size to about one-fourth of an inch. These pieces were exhausted from the mill in its air exhaust stream (typically at about 160 to 190 feet per second) and were directed into an injection system as shown in FIG. 7 in which a commercially available agent (e.g. Emcol 4500 or Witconate 1238) was applied evenly over substantially all the pieces substantially covering them and producing a product which was about 1½ weight percent SAA (e.g. about 33 pounds of surface active agent mixed with about 415 pounds of water was sprayed onto about 2100 pounds of cellulose pieces resulting in a surface active agent content by weight of the pieces of about 1.57%). The product was then pelletized and flaked (as previously described herein) to a bulk density of about 9 to about 18 pounds per cubic foot. An odor identifier (e.g. oil of wintergreen) is added to the SAA to facilitate identification of SAA-treated product. For this embodiment it is preferred that flaking be accomplished with a crimper having dual opposed rollers rotating toward each other, one at 450 r.p.m. and the other at 1100 r.p.m. The surface active agent aids in producing a pellet and/or flake of desired hardness, density, temperature, heat holding capacity, and expansion rate by increasing water absorption rate and by more thoroughly wetting the pieces of cellulose.

The following table compares the absorbency of various substances by absorbent material according to this invention with and without SAA.

| Flaked Material #1 (50 grams) | | |
|---|---|---|
| Substance | Amt. Absorbed without SAA (grams) | Amt. Absorbed with SAA (grams) |
| Water | 144 | 224 |
| 30 wt. Oil | 68 | 139 |
| Used Motor Oil | 89.2 | 127.6 |
| Antifreeze | 200.5 | 248 |
| Transmission Fluid | 71.3 | 111 |
| Diesel Oil | 50.6 | 89.8 |

(e.g. 50 grams of material #1 without SAA absorbed 68 grams of 30 wt. oil and 50 grams of material #1 with SAA absorbed 139 grams of 30 wt. oil). Material #1 was pelletized, flaked, absorbent material made as previously described. The absorption capacity by weight for, e.g., water of the material with SAA was about 4.4, i.e. 50 grams of the material absorbed about 4.48 times its own weight of water; for oil it is about 2.7. It is preferred that absorption capacity of water for flaked material with SAA be at least 4 and for oil be at least 2.4

| Absorbent Material #2 (50 grams) | | |
|---|---|---|
| Substance | Amt. Absorbed without SAA | Amt. Absorbed with SAA |
| Water | 392.8 | 650 |
| Mineral Spirits | 440.0 | 578 |

Material #2 was absorbent material as produced from the injection system as previously described without further processing (no pelletizing, no flaking). It is preferred that absorption capacity for absorbent material with SAA for water be at least 10 and for -continued oil be at least 9.

In another embodiment of the present invention about ten grams of flaked material (density about 15 lbs./cubic foot) according to the present invention as previously described was used to absorb an oil/water mixture (80 grams 10W-30 motor oil, 60 grams water). The material absorbed 1.7 times its own weight of the mixture. Additional amounts of about ten grams of the material were treated to 1% by weight with the following commercially available hydrophobic agents and exhibited the listed absorption capacities:

| Material | Hydrophobic Agent | Absorption (times weight) |
|---|---|---|
| 1. | Paracol 802N | 1.94 |
| 2. | EW 58 | 2.07 |
| 3. | Bersize 6900 | 2.39 |

Upon adding a surface active agent Desonic 1.5N at 1.5% by weight to materials similar to materials 1,2, and 3 above, the following absorption capacities were noted:

| Material | Absorption |
|---|---|
| 1A. | 2.60 |
| 2A. | 2.88 |
| 3A. | 2.77 |

(1A corresponds to 1, etc.; 1A was about ten grams of the flaked absorbent material plus 1% by weight hydrophobic agent plus 1.5% by weight SAA, and similarly for the other materials.)

Upon adding a different surface active agent (1.5% by weight Desonic 4N) to about-ten-gram amounts of the absorbent material treated with the hydrophobic agents as with materials 1,2, and 3 above, the following absorption capacities were noted:

| Material | Absorption |
|---|---|
| 1B. | 2.88 |
| 2C. | 3.00 |
| 3C. | 2.80 |

These data show that adding a surface active agent to this material according to this invention treated with a hydrophobic agent increases absorption by weight.

In methods as described above, a desired organic polymer for sludge conditioning may be used in place of a surface active agent or in combination therewith; and processed cellulose material as described may be sprayed (or otherwise treated as described above) with the polymer or with polymer and surface active agent. Alternatively solid polymer may be combined with the cellulose material prior to a grinding up step, in a first stage mill or in a finishing mill or some combination of such addition steps.

In one embodiment cellulose material treated with an organic polymer is mixed with water and with a portion of sludge to create a treatment slurry that is then introduced, e.g. pumped, into the sludge to be treated. Preferably, in one embodiment, such a slurry has about 0.08 to about 0.24 ounces of cellulose to about 32 ounces of water and sludge.

In one process according to the present invention the treatment material was processed cellulose (as previously described) treated with a surfactant (as previously described) to create a treatment slurry that is then introduced, e.g. pumped, into the sludge to be treated. Preferably, in one embodiment, such a slurry has about 0.08 to about 0.24 ounces of cellulose to about 32 ounces of water and sludge.

In one process according to the present invention the treatment material was processed cellulose (as previously described) treated with a surfactant (as previously described—macerated cellulose pieces ranging in size between one eighth inch and seven-sixteenths of an inch and sprayed with Witconate 1238 as in FIG. 7). The sludge treated ("Reference Sludge") was a biological waste activated sludge from a commercial water treatment plant in a large city and had a pH of 5.84; specific gravity at sixty degrees F. of 0.97; and percent solids of 3.0 AC787 organic polymer commercially available from Allied Colloids, Inc. was used. For each test 1–4 described below 250 milliliters of Reference Sludge was treated.

TABLE V

| Test Number | Cellulose Material (% wt.) | Polymer (% wt.) | Cake Solids (%) |
|---|---|---|---|
| 1 | None | 0.0068 | 21 |
| 2 | 0.0025 | 0.0050 | 25 |
| 3 | 0.0050 | 0.0030 | 28 |
| 4 | 0.0075 | 0.0033 | 28 |

In Test 1 the Reference Sludge was conditioned by adding 0.68 percent by weight (0.0068) AC 787 polymer, resulting in a filter cake (from a typical belt press filter) with 21 percent solids. Cellulose material was not used.

In Test 2 the Reference Sludge was conditioned by adding 0.50 percent (0.005) polymer and 0.25 percent (0.0025) cellulose material treated with Witconate 1238 surfactant, resulting in a filter cake with 25 percent solids. The small amount (0.0025) of surfactant-treated cellulose material added to the sludge resulted in a 19 percent increase in filter cake solids, and 27 percent decrease in polymer consumption.

In Test 3 the Reference Sludge was conditioned by adding 0.30 percent (0.003) polymer and 0.50 percent (0.005) cellulose material treated with the surfactant, resulting in a filter cake with 28 percent solids. This test demonstrated that there is, for a specific sludge, an optimum relationship between cellulose material, preferred surfactant, and preferred polymer and a "peak effect amount" of treated cellulose.

Testing was conducted to determine the impact that cellulose material treated with the surfactant in Tests 1–4 had on filtrate quality. In the tests, the quantity of water used to wash the filter belts was measured and its solids content was determined. For Test 1 (without cellulose material) 3,100 ml of wash water was needed to clean the belts. The resultant water contained 0.05 lbs. of solids per gallon. For Test 2 (with cellulose material) 1,700 ml of wash water was needed to clean the belts. The resultant water contained 0.0164 lbs. of solids per gallon. This was a 67% reduction in the amount of filter wash water returned to the facility's waste water for treatment and disposal.

In other methods according to the present invention the Reference Sludge as previously described was treated as described in the following Tests 5–7. For Test 5 the Reference Sludge was conditioned by adding 0.68 percent (0.0068) AC 787 polymer only. Cellulose material was not used. This established a reference point for filter cake solids without cellulose conditioning to be 21 percent by weight.

For Tests 6 and 7 seventy (70) pounds of cellulose material treated with Witconate 1238 surfactant was mixed with 150 gallons of water to create a slurry to facilitate the introduction of the cellulose into the sludge feed. The cellulose slurry was then induced into the sludge feed at a sludge pump suction. The sludge feed flow was 90 gpm. AC 787 polymer was injected into the cellulose conditioned sludge feed just prior to entering the BFP (Belt Press Filter). During Test 6 the cellulose slurry was delivered at 2.4 lbs/minute. During Test 7 the cellulose slurry was delivered at 1.9 lbs/minute. During each test an improvement in solids floccing was witnessed at the belt press filter inlet as soon as the cellulose material was observed in the sludge feed. In Test 6 preconditioning the sludge with cellulose material treated with the surfactant prior to processing by a belt press filter produced a filter cake with 30.8 percent solids using 44 percent less polymer than in Test 5. In Test 7 preconditioning the sludge with cellulose material treated with a surfactant prior to processing by a BFP produced a filter cake with 29.0 percent solids. Table VI presents results for Tests 5-7.

TABLE VI

| Test Number | Cellulose Material (% wt.) | Polymer (% wt.) | Cake Solids (%) |
|---|---|---|---|
| 5 | None | 0.0068 | 21.0 |
| 6 | 0.0032 | 0.0038 | 30.8 |
| 7 | 0.0025 | 0.0038 | 29.9 |

In other methods according to the present invention a Reference Sludge from a city's waste water treatment plant was treated. The Reference Sludge had a pH of 7.18; specific gravity at sixty degrees F. of 0.97; and percent solids of 2.0. The polymer used was commercially available 3196 Polymer. For tests 8-11 below, the sludge was treated by a prior art BFP and by a FVFP ("Fixed Volume Filter Press"). In each test 500 milliliters of the Reference Sludge was treated. Once the sludge coagulated sufficiently to facilitate dewatering, it was processed by a BFP and a FVFP.

TABLE VII

| Test Number | Cellulose | Polymer | Cake Solids | Cycle Time | Volume Reduction |
|---|---|---|---|---|---|
| 8 | None | 0.020 | 17% | 10.0 min | 91.0% |
| 9 | 0.005 | 0.016 | 29% | 10.0 min | 90.6% |
| 10 | None | 0.020 | 23% | 30.0 min | 87.0% |
| 11 | 0.005 | 0.020 | 34% | 9.5 min | 91.0% |

In Test 8 the Reference Sludge was conditioned by adding two percent (0.020) by weight of 3196 polymer. Cellulose material was not used. The conditioned sludge was then processed through a BFP resulting in a filter cake with 17 percent solids, and a 91 percent reduction in sludge volume.

In Test 9 the Reference Sludge was conditioned by adding 1.6 percent (0.016) by weight of 3196 polymer and 0.5 percent (0.005) by weight of cellulose material treated with Witconate 1238 surfactant. The conditioned sludge was then processed through a BFP resulting in a filter cake with 29 percent solids, and a 90.6 percent reduction in sludge volume. The small amount of surfactant-treated cellulose material (0.005) when added to the sludge increased filter cake solids by 71 percent with 20 percent less polymer. There was no difference in cycle time between Tests 1 and 2.

In Test 10 the Reference Sludge was conditioned by adding two percent (0.020) by weight of 3196 polymer. Cellulose material was not used. The conditioned sludge was then processed through a FVFP resulting in a filter cake with 23 percent solids, and a 87 percent reduction in sludge volume. Cycle time was 30 minutes.

In Test 11 the Reference Sludge was conditioned by adding 2 percent (0.020) by weight of 3196 polymer and 0.5 percent (0.005) by weight of cellulose material treated with the surfactant. The conditioned sludge was then processed through a FVFP resulting in a filter cake with 34 percent solids, and a 91 percent reduction in sludge volume. The small amount of surfactant-treated cellulose material (0.005) when added to sludge increased filter cake solids by 71 percent with no change in polymer consumption, with a 5 percent improvement in sludge volume reduction, and a 68 percent improvement in cycle time.

In certain preferred embodiments of methods for conditioning sludge according to the present invention, the method includes adding a treatment material to the sludge; the treatment material comprising treated pieces of cellulose; the pieces of cellulose treated by combining them with a treating substance. In one aspect, prior to adding the treatment material to the sludge, the pieces of cellulose are sprayed with the treating substance; including but not limited to spraying the pieces of cellulose with a surfactant to substantially coat them with about one half percent to about three percent surfactant by weight. In another aspect, prior to adding the treatment material to the sludge, the pieces of cellulose are combined with a polymer as the treating substance including but not limited to a polymer which is a flocculant; and in one aspect the amount of polymer by weight equaling one percent to seven and a half percent of the total weight of the polymer plus the cellulose. 3196 Polymer is a cationic polymer in water-in-oil emulsion commercially available from Aries Chemical Incorporated. The polymer is a cationic polyacrylamide.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized.

What is claimed is:

1. A method for conditioning sludge, the method comprising
   adding a treatment material to the sludge, the treatment material comprising pieces of cellulose ranging in size between one-eighth inch and seven-sixteenths of an inch in a largest dimension and mixed with pieces of a solid polymer that increases ability of the pieces of cellulose to dewater the sludge.

2. The method of claim 1 further comprising
   spraying the pieces of cellulose with a surfactant to substantially coat them with about 0.5% to about 3% surfactant by weight.

3. The method of claim 1 wherein the solid polymer is a flocculant.

4. A method for conditioning sludge, the method comprising forming a slurry of sludge and pieces of cellulose mixed with pieces of a solid polymer that increase ability of the pieces of cellulose to dewater the sludge, the pieces of cellulose ranging in size between one-eighth inch and seven-sixteenths of an inch in a largest dimension, introducing the slurry into a sludge feed stream producing a secondary stream for feeding into sludge dewatering apparatus, and feeding the secondary stream into the dewatering apparatus.

5. The method of claim 4 comprising spraying the pieces of cellulose with a surfactant to substantially coat them with about 0.5% to about 3% surfactant by weight.

6. The method of claim 5 wherein the polymer is a flocculant.

* * * * *